(12) United States Patent
Gut

(10) Patent No.: US 12,096,526 B2
(45) Date of Patent: Sep. 17, 2024

(54) METHOD FOR CONTROLLING A VARIABLE LIGHT DISTRIBUTION

(71) Applicant: DAIMLER AG, Stuttgart (DE)

(72) Inventor: Carsten Gut, Korb (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 323 days.

(21) Appl. No.: 17/634,646

(22) PCT Filed: Jul. 29, 2020

(86) PCT No.: PCT/EP2020/071400
§ 371 (c)(1),
(2) Date: Feb. 11, 2022

(87) PCT Pub. No.: WO2021/028224
PCT Pub. Date: Feb. 18, 2021

(65) Prior Publication Data
US 2022/0289102 A1  Sep. 15, 2022

(30) Foreign Application Priority Data
Aug. 13, 2019  (DE) ..................... 10 2019 005 674.4

(51) Int. Cl.
*H05B 45/10* (2020.01)
*B60Q 1/14* (2006.01)

(52) U.S. Cl.
CPC .......... *H05B 45/10* (2020.01); *B60Q 1/1423* (2013.01); *B60Q 2300/054* (2013.01); *B60Q 2300/336* (2013.01)

(58) Field of Classification Search
CPC .............. B60Q 2300/336; B60Q 1/085; B60Q 2300/112; B60Q 2300/054; B60Q 1/143; B60Q 2300/335; B60Q 1/18; B60Q 1/1423; B60Q 2300/122; B60Q 2300/334; B60Q 2300/134; B60Q 2300/322;
(Continued)

(56) References Cited

U.S. PATENT DOCUMENTS

| 6,817,740 B2 | 11/2004 | Kobayashi et al. |
| 7,156,542 B2 * | 1/2007 | Miller ................... B60Q 1/085 362/466 |

(Continued)

FOREIGN PATENT DOCUMENTS

| DE | 10164193 A1 | 7/2002 |
| DE | 19756574 C2 * | 11/2003 ............. B60Q 1/085 |

(Continued)

OTHER PUBLICATIONS

Office Action dated Nov. 25, 2023 in related/corresponding CN Application No. 202080057429.8.

(Continued)

*Primary Examiner* — Michael P Stafira
(74) *Attorney, Agent, or Firm* — PATENT PORTFOLIO BUILDERS PLLC

(57) ABSTRACT

A method for controlling variable light distribution of a headlight of a vehicle involves adjusting the light distribution relative to an intersection area when the intersection area is approached. The adjustment of the light distribution is updated depending on the distance of the vehicle from the intersection area.

9 Claims, 1 Drawing Sheet

Figure 1:
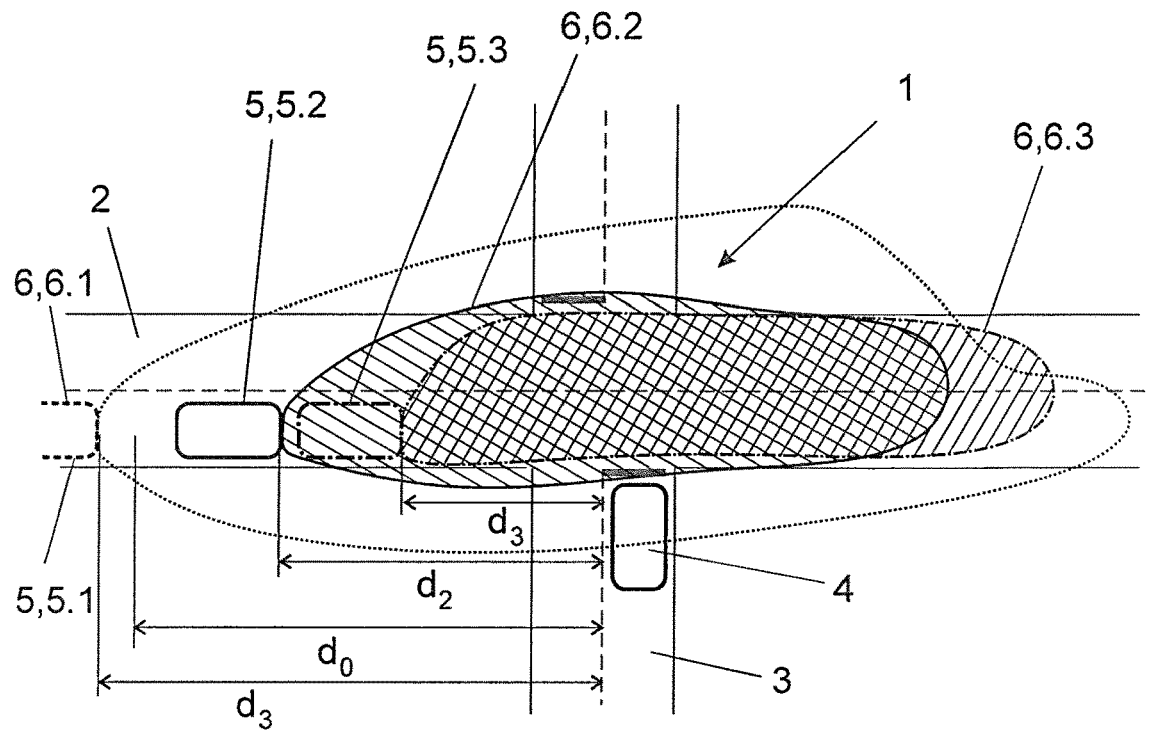

(58) Field of Classification Search
CPC ........ B60Q 2300/142; B60Q 2300/333; B60Q 1/12; B60Q 1/16; B60Q 2300/052; B60Q 1/46; B60Q 2300/056; B60Q 2300/114; B60Q 2300/314; B60Q 2300/32; B60Q 2300/33; B60Q 2300/41; B60Q 2400/50; B60Q 2300/3321; B60Q 2300/42; B60Q 2300/45; B60Q 2300/00; H05B 45/10; H05B 45/30; H05B 47/125; H05B 47/105; H05B 47/11
See application file for complete search history.

(56) References Cited

U.S. PATENT DOCUMENTS

| | | | |
|---|---|---|---|
| 2002/0036907 A1 | | 3/2002 | Kobayashi et al. |
| 2004/0114379 A1 | | 6/2004 | Miller et al. |
| 2013/0051041 A1 | * | 2/2013 | Mohamed ............... B60Q 1/12 362/465 |
| 2020/0055440 A1 | * | 2/2020 | Mano .................... B60Q 1/143 |

FOREIGN PATENT DOCUMENTS

| | | | | |
|---|---|---|---|---|
| DE | 10300771 A1 | | 5/2004 | |
| DE | 102005038581 A1 | | 3/2007 | |
| DE | 102007007467 A1 | | 8/2008 | |
| DE | 102008061747 A1 | * | 6/2009 | ............ B60Q 1/085 |
| DE | 102009054238 A1 | * | 5/2011 | ............ B60Q 1/085 |
| DE | 102011076644 A1 | | 11/2012 | |
| DE | 102012200431 A1 | | 7/2013 | |
| DE | 102012020410 A1 | | 10/2013 | |
| DE | 102013020412 A1 | | 6/2015 | |
| DE | 102014102757 A1 | * | 9/2015 | .......... G01M 11/064 |
| DE | 102014204310 A1 | * | 9/2015 | ............ B60Q 1/085 |
| DE | 102014009254 A1 | | 12/2015 | |
| EP | 2666671 A1 | * | 11/2013 | ............ B60Q 1/143 |
| EP | 2957461 A1 | * | 12/2015 | ............ B60Q 1/085 |
| FR | 2812844 A1 | * | 2/2002 | .............. B60Q 1/12 |
| JP | 5770007 B2 | | 8/2015 | |
| WO | WO-2015022115 A1 | * | 2/2015 | ............ B60Q 1/143 |
| WO | WO-2017088001 A1 | * | 6/2017 | ............ B60Q 1/143 |

OTHER PUBLICATIONS

International Search Report mailed Nov. 4, 2020 in related corresponding International Application No. PCT/EP2020/071400.
Office Action created May 15, 2020 in related/corresponding DE Application No. 10 2019 005 674.4.
Written Opinion mailed Nov. 4, 2020 in related corresponding International Application No. PCT/EP2020/071400.

* cited by examiner

METHOD FOR CONTROLLING A VARIABLE LIGHT DISTRIBUTION

BACKGROUND AND SUMMARY OF THE INVENTION

Exemplary embodiments of the invention relate to a method for controlling variable light distribution of a headlight of a vehicle.

The control of lighting devices in a vehicle is known in principle from the prior art. By way of example, DE 10 2012 020 410 A1 describes the adjustment of light distribution using digital map information in order to be able to adjust the light distribution relative to events on the road, such as bends or similar, before they come into the field of vision of a sensor system installed in the vehicle.

DE 10 2012 200 431 A1 describes a method for determining the presence of an intersection in the course of a road driven on by a vehicle. It states that traffic driving through the intersection can be detected based on a visual headlight cone detection system, such that the vehicle's own lighting can be adjusted, for example by switching off the full beam and/or adjusting the headlight cone.

Finally, DE 10 2011 076 644 A1 also describes a method for controlling variable light distribution of a headlight of a vehicle. In this document, vehicle-to-vehicle communication takes place in order to detect signals emitted by vehicles in the intersection area and, for example, to adjust the light distribution in such a way that other road users are not dazzled. The aforementioned document also describes in detail an adjustment of the variation of the light distribution depending on the speed of a vehicle, in order to be able to carry out an earlier adjustment of the light distribution at a high vehicle speed than at a slower speed.

Exemplary embodiments of the present invention are directed to a method for controlling variable light distribution when approaching an intersection area, which is further improved compared to the prior art.

In practice it is the case, and this is also described accordingly at least in the last-mentioned prior art, that traffic driving through the intersection in certain situations at night cannot be correctly detected by the sensor system of one's own vehicle, which is also referred to as an ego vehicle. This can lead to the traffic driving through the intersection being dazzled by an automated full beam or partial full beam. In order to precisely prevent this, it is provided in the method according to the invention that the light distribution is adjusted relative to the intersection area, and this occurs substantially independently of whether or not other vehicles are present in this area. In accordance with the invention, the adjustment of the light distribution is updated depending on the distance of the vehicle from the intersection area. Thus, unlike in the prior art, only the presence of the intersection, which is detected based on map-based data and satellite navigation to determine the position of the vehicle, is used to update the lighting. At any distance of the vehicle from the intersection, the illumination always remains optimal by dimming or reducing the glare in the areas where other vehicles could potentially be present. Dazzling traffic driving through the intersection in intersection areas, such as junctions, crossroads or in particular roundabouts, is thus reliably prevented.

According to an extraordinarily favorable development of the method according to the invention, it is further provided that the adjustment starts from a predetermined limit distance of the vehicle from the intersection area. The adjustment of light distribution depending on the distance of the vehicle from the intersection area thus starts automatically from a predetermined limit distance, which is ideally less than 100 m, such that the intersection area is always optimally illuminated without having to fear dazzling other road users as soon as the ego vehicle falls below the limit distance.

According to a very advantageous embodiment of the method according to the invention, the adjustment can be designed as dimming, dipping, and/or reducing the glare in partial areas of the light distribution. These possibilities are known from the prior art and ultimately depend on the design of the headlight, which is of secondary importance for the present invention. By way of example, in the case of a pixel main beam, a so-called multi-beam, targeted glare reduction of individual areas can take place, while in the case of a static full beam, for example a static LED full beam, a corresponding dimming takes place in order to adjust the light distribution.

According to a very advantageous development of the method according to the invention, the headlight is designed as a pixel headlight. By means of such a pixel headlight having several individual light points, which can either be switched on and off in a targeted manner or whose light beam can be directed in different directions in a targeted manner, it is possible to implement complex light distributions. In this way, individual areas can be specifically glare-free, i.e., excluded from a full beam distribution. This is known in principle from the prior art.

According to a very advantageous development of this embodiment of the method according to the invention, it is now further provided that, in the case of a roundabout as the intersection area, at least the central area of the light distribution is dimmed or glare-free. Particularly in the case of roundabouts, this ensures that the central illumination area is not illuminated or is not illuminated to such an extent. This safely and reliably prevents the road users driving round the roundabout from being dazzled.

According to another very advantageous embodiment of the method according to the invention using a pixel headlight, it can be further provided that a width and/or number of lanes of the road being travelled on are also taken into account in order to adjust a magnitude of the glare reduction. This enables further refinement of the light distribution, which ensures even better illumination for a person driving the ego vehicle or the sensor system installed in this vehicle on the one hand and even better avoidance of dazzling other road users on the other hand.

According to an extraordinarily favorable alternative embodiment, the method according to the invention can also be used when a static headlight, for example an LED full beam, is used without the possibility of directly influencing the detailed shape of the light distribution. In this case, the adjustment can then take place via dimming and/or dipping in order to still achieve the desired effects completely, or at least as far as the corresponding headlight allows.

For this case, it can therefore be provided that, according to a very advantageous development of this embodiment of the method according to the invention, the dipping takes place at a dimming rate that depends on the square of the distance of the vehicle from the intersection area. In particular, the relationship can follow the mathematical formula $1-1/d^2$, wherein d is the distance of the vehicle from the intersection area. Using this formula, a very good effect can also be achieved with a pure dimming of the light by adjusting the dimming rate according to the distance of the vehicle from the intersection.

As already mentioned, map data and satellite-based navigation, for example GPS or Galileo, can be used to analyze light distribution and/or the approach to an intersection. According to a very advantageous embodiment of the method according to the invention, GPS-based ADASIS data are used. These data follow the so-called ADASIS (Advanced Driver Assistance System Interface Specification), which has been defined by various car manufacturers and suppliers for the processing of data in navigation systems and can accordingly be used here as a "quasi"-standardized database in a particularly simple, efficient and reliable manner.

Further advantageous embodiments of the method according to the invention also emerge from the exemplary embodiment, which is described in more detail below with reference to the figures.

BRIEF DESCRIPTION OF THE DRAWING FIGURES

Figure 2:
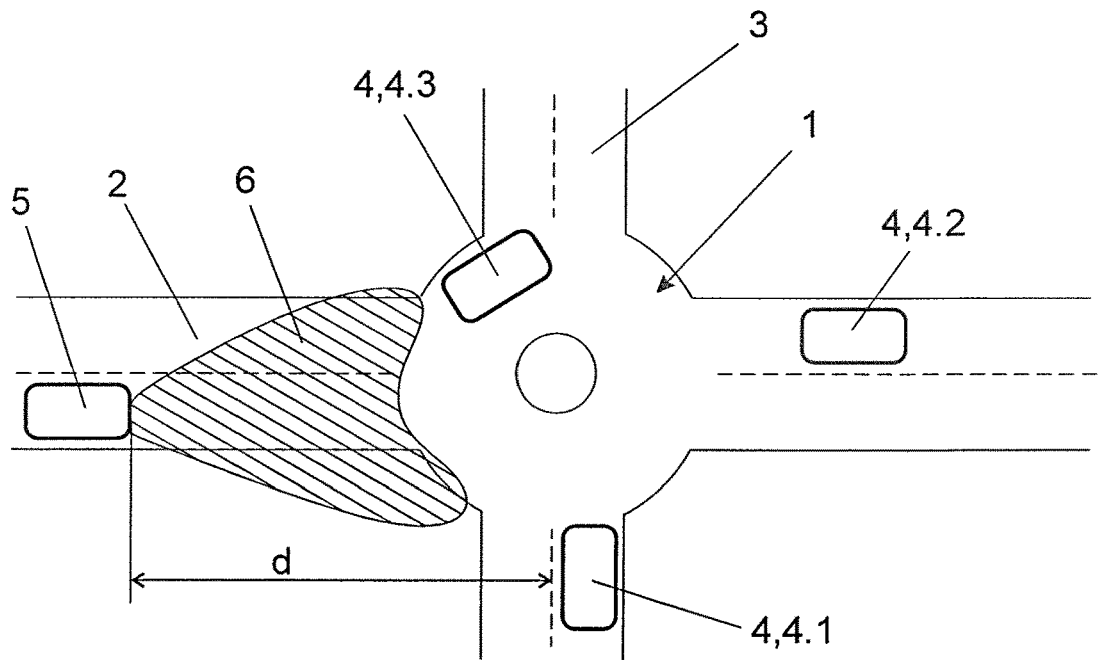

Here are shown:

FIG. 1 a schematic depiction of possible light distributions according to the method according to the invention when a vehicle approaches an intersection; and FIG. 2 a possible light distribution when a vehicle approaches an alternative intersection area.

DETAILED DESCRIPTION

The depiction in FIG. 1 shows an intersection area 1 between a main road 2 and a crossing road 3. The intersection area is designed here as crossroads. An intersection area 1 in the sense of the invention could also be a mere junction on one side of the road 2, or as indicated in FIG. 2, a roundabout. Other intersection areas with roads not intersecting at right angles would of course also be conceivable.

A vehicle designated 4 is indicated on the road 3, waiting to cross or turn onto the main road 2. On the main road 2, a vehicle designated 5 is approaching, which is intended to be the ego vehicle 5 of the scenario depicted here. This ego vehicle 5 is shown in three different positions. In a first position, the ego vehicle 5 is labelled 5.1 and is shown at a distance $d_1$ from the intersection area 1. The distance $d_1$ is greater than a boundary distance do, which is also shown. The ego vehicle 5 in the position 5.1 has a light distribution 6, indicated with dots and designated 6.1. This light distribution 6.1 is the standard light distribution of the vehicle 5 with a so-called full beam. As long as the vehicle 5 is at a distance d from the intersection area 1 which, like the distance $d_1$, is greater than the limit distance $d_0$, this light distribution 6.1 is typically selected. From the limit distance do, which the ego vehicle 5 has already passed in its position 5.2, a modified light distribution, which is designated here as 6.2 and depicted hatched, is set. This takes into account the design of the intersection area 1 based on GPS-based ADASIS data. Depending on the distance d, which is designated as $d_2$ in position 5.2, the light distribution 6.2 is adjusted such that the intersection area 1 is illuminated in the desired manner without dazzling other road users, such as the vehicle 4 in this case.

The light distribution 6.2 is dependent on the distance d between the ego vehicle 5 and the intersection area 1. If the ego vehicle continues to approach the intersection area, as indicated by the ego vehicle 5 in the position 5.3 indicated dot-dashed, the light distribution 6.3 remains, such that the illumination of the intersection area 1 always remains optimal at any distance d. Due to the distance-dependent influence of the light distribution 6.2 and 6.3 in the example shown here, which is specified below the limit distance $d_0$ depending on the respective current distance d, an optimal illumination is thus always achieved. Furthermore, in particular when pixel headlights are used in the ego vehicle 5, the central area of the intersection, on which other road users 4 may be located, can be glare-reduced or, in particular when static headlights are used, dimmed. This glare reduction or dimming of the central section of the intersection area 1 is particularly important in the case of roundabouts as the intersection area 1. It can therefore be seen in the example of a roundabout in the depiction of FIG. 2, wherein, in addition to the ego vehicle 5 in a position at a distance d from the center of the roundabout, four other road users 4.1, 4.2 and 4.3 are also schematically indicated here.

As intersection areas 1, as depicted in FIG. 1, a distance-dependent dimming of the right and left full beam illumination areas can now take place when using a pixel headlight, as can be seen between the light distributions 6.1 at a distance $d_1$ which is greater than the limit distance do in comparison to the light distributions 6.1 and 6.2. The following applies: the closer the intersection area 1 is, i.e., the smaller the distance d, the dimming becomes correspondingly greater. In addition to the distance, the width or number of lanes on the road 2 on which the ego vehicle 5 is moving is preferably also accounted for in the calculation of the parameters such as the extent of dipping and dimming.

When using a static LED full beam, this full beam is substantially only dimmed increasingly from the limit distance do onwards, wherein the dimming rate is specified by the mathematical relationship $1-1/d^2$ such that it changes accordingly depending on the distance.

With roundabouts, it is the case that, in a pixel headlight for generating the main beam, a distance-dependent dimming takes place, especially of the central illumination area, as indicated in the depiction in FIG. 2. In this case, the closer the ego vehicle 5 is to the roundabout as an intersection area 1, the larger the central glare-reduced area and the dimming rate become. In this case, the distance is primarily taken into account for calculating the extent of dipping and dimming rate parameters, wherein the width of the road 2 could also be taken into account here.

For a static LED full beam, dimming is also gradually applied to roundabouts as intersection areas 1 from a defined limit distance do, which is typically less than 100 m. Here again, the dimming rate depends on the distanced of the ego vehicle 5 to the roundabout as the intersection area 1 according to the formula $1-1/d^2$. This means that at large distances, it is not dimmed as much and at small distances, the light is dimmed all the more.

For both traffic situations, ADASIS data based on GPS, or in the future also Galileo, is used. In this way, dazzling traffic driving through the intersection at roundabouts, intersections and/or junctions as intersection areas 1 can be avoided accordingly by the automatic full beam or at least the risk of such dazzling can be reduced.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
   determining a distance between a vehicle and an intersection area; and
   controlling variable light distribution of a headlight of the vehicle by adjusting the light distribution relative to the intersection area when the vehicle approaches the intersection area,
   wherein the adjustment of the light distribution is updated depending on the determined distance of the vehicle from the intersection area so that
      dimming or dipping of the headlight increases as the determined distance decreases, or
      a size of the light distribution decreases as the determined distance decreases.

2. The method of claim 1, wherein the adjustment of the light distribution starts from a predetermined limit distance of the vehicle from the intersection area.

3. The method of claim 1, wherein the headlight is a pixel headlight.

4. A method, comprising:
   determining a distance between a vehicle and an intersection area; and
   controlling variable light distribution of a headlight of the vehicle by adjusting the light distribution relative to the intersection area when the vehicle approaches the intersection area,
   wherein the adjustment of the light distribution is updated depending on the determined distance of the vehicle from the intersection area,
   wherein the headlight is a pixel headlight, and
   wherein when the intersection area is a roundabout, at least a central area of the light distribution is dimmed or glare-free.

5. The method of claim 3, wherein a width or number of lanes of the road travelled on by the vehicle is also accounted for to adjust an extent of dimming or size of a dimmed area.

6. The method of claim 1, wherein the headlight is a static headlight.

7. A method, comprising:
   determining a distance between a vehicle and an intersection area; and
   controlling variable light distribution of a headlight of the vehicle by adjusting the light distribution relative to the intersection area when the vehicle approaches the intersection area,
   wherein the adjustment of the light distribution is updated depending on the determined distance of the vehicle from the intersection area,
   wherein the headlight is a static headlight, and
   wherein the adjustment of the light distribution involves dimming the headlight at a dimming rate that depends on the determined distance of the vehicle from the intersection area.

8. The method of claim 7, wherein the dimming rate follows a relationship of $1-1/d^2$, wherein d is the determined distance of the vehicle from the intersection area.

9. The method of claim 1, wherein GPS-based Advanced Driver Assistance System Interface Specification (ADASIS) data is used to analyze the adjustment of the light distribution or the approach of the vehicle to the intersection area.

* * * * *